United States Patent
Huhn et al.

(10) Patent No.: US 9,992,188 B2
(45) Date of Patent: Jun. 5, 2018

(54) METHODS AND SYSTEMS FOR SINGLE SIGN-ON WHILE PROTECTING USER PRIVACY

(71) Applicant: Apple Inc., Cupertino, CA (US)

(72) Inventors: Derrick S. Huhn, San Francisco, CA (US); Jeremy M. Werner, Burlingame, CA (US); Amol V. Pattekar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 15/298,190

(22) Filed: Oct. 19, 2016

(65) Prior Publication Data

US 2017/0104747 A1    Apr. 13, 2017

Related U.S. Application Data

(62) Division of application No. 13/913,232, filed on Jun. 7, 2013, now Pat. No. 9,479,490.

(51) Int. Cl.
*G06F 15/16* (2006.01)
*H04L 29/06* (2006.01)
*G06F 21/45* (2013.01)

(52) U.S. Cl.
CPC .......... *H04L 63/0815* (2013.01); *G06F 21/45* (2013.01)

(58) Field of Classification Search
CPC ........ G06F 21/31; H04L 63/08; H04L 63/083
USPC .............. 713/168–174, 182–186, 202; 726/7
See application file for complete search history.

(56) References Cited

U.S. PATENT DOCUMENTS

| | | |
|---|---|---|
| 7,747,540 B2 | 6/2010 | Cameron et al. |
| 8,286,228 B2 | 10/2012 | Venters, III et al. |
| 9,479,490 B2 | 10/2016 | Huhn et al. |
| 2004/0267870 A1 | 12/2004 | Rozmus et al. |

(Continued)

FOREIGN PATENT DOCUMENTS

WO    2001072009 A2    9/2001

OTHER PUBLICATIONS

Chappell, David "Introducing Windows CardSpace", dated Apr. 2006, published by Microsoft 2011, http://msdn.microsoft.com/en-us/library/aa480189( d=printer).aspx, pp. 1-20.

(Continued)

*Primary Examiner* — Evans Desrosiers
(74) *Attorney, Agent, or Firm* — Dickinson Wright RLLP

(57) ABSTRACT

A method of enabling applications to reference user information is provided, including receiving a request for a user identifier that references a user of the application and sending a second request for the user identifier to a server. The second request may include a second user identifier that references the user and a second authentication token for the second user identifier. Furthermore, the second user identifier and the second authentication token are not accessible by the user. The method includes receiving the user identifier and an authentication token for the first user identifier. The user identifier corresponds to the second identifier; and providing the user identifier and authentication token to the application. A method of enabling an application to identify users associated with a user of the application is provided; the method may include receiving, from the server, user identifiers that reference one or more users scoped to the application.

20 Claims, 11 Drawing Sheets

(56) References Cited

U.S. PATENT DOCUMENTS

| | | |
|---|---|---|
| 2005/0165698 A1 | 7/2005 | Cho et al. |
| 2006/0155993 A1 | 7/2006 | Busboon |
| 2006/0242210 A1 | 10/2006 | Ring et al. |
| 2007/0061330 A1* | 3/2007 | Newton ................ G06Q 10/10 |
| 2007/0143860 A1 | 6/2007 | Hardt |
| 2008/0028215 A1 | 1/2008 | Nanda et al. |
| 2008/0319823 A1* | 12/2008 | Ahn ...................... G06Q 30/02 |
| | | 705/51 |
| 2010/0274910 A1 | 10/2010 | Ghanaie-Sichanie et al. |
| 2011/0282940 A1 | 11/2011 | Zhang et al. |
| 2012/0159588 A1 | 6/2012 | Zhu et al. |
| 2012/0170750 A1 | 7/2012 | Orsini et al. |
| 2012/0291114 A1 | 11/2012 | Poliashenko et al. |

OTHER PUBLICATIONS

PCT Patent Application No. PCT/2014/035030—International Search Report dated Sep. 17, 2014.
Taiwanese Patent Application No. 103116742—Office Action dated Aug. 24, 2015.

* cited by examiner

METHODS AND SYSTEMS FOR SINGLE SIGN-ON WHILE PROTECTING USER PRIVACY

CROSS-REFERENCE TO RELATED APPLICATIONS

This application is a divisional of U.S. application Ser. No. 13/913,232, filed Jun. 7, 2013, entitled "METHODS AND SYSTEMS FOR SINGLE SIGN-ON WHILE PROTECTING USER PRIVACY," which is set to issue as U.S. Pat. No. 9,479,490 on Oct. 25, 2016, the content of which is incorporated herein by reference in its entirety for all purposes.

FIELD

The described embodiments relate generally to methods, devices, and systems for developing applications in datacenters. More particularly, embodiments disclosed herein relate to methods and systems for single sign-on while protecting user privacy and address book discovery for users of network-based software applications.

BACKGROUND

The proliferation of client computing devices—such as smart phones and tablets—has drastically changed the manner in which software applications are designed and executed. Software applications rely on accessing server computing devices such as a development server that are designed to interact with the software applications. When a software application contacts the server, a user authentication takes place in order for the server to release and provide data and services. In many instances, the application provider or developer handles the user personal information in the sign-on process with the development server. While this configuration simplifies operation of the software application, it exposes the privacy of the users to a third party (at least the developer). As developers take advantage of the information they may handle, users become bombarded with unwanted advertisements, solicitation, and e-mail spam. Eventually, the software application becomes unpopular and losses user subscriptions.

Therefore, what is desired is a sign-on configuration for a network-based software application that protects user privacy from third parties.

SUMMARY

In a first embodiment, a method for enabling applications to reference user information is provided. The method may include receiving, from an application, a first request for a first user identifier that references a user of the application and sending a second request for the first user identifier to a server. Accordingly, the second request includes a second user identifier that references the user and a second authentication token for the second user identifier, where the second user identifier and the second authentication token are not accessible by the user. The method may also include receiving, from the server, the first user identifier and a first authentication token for the first user identifier, where, in some embodiments, the first user identifier corresponds to the second identifier. Finally, the method includes providing the first user identifier and the first authentication token to the application.

In a second embodiment, a method for enabling an application to identify one or more users associated with a first user of the application is provided. The method includes receiving, from an application, contact information that can be used to identify one or more users. The method further includes receiving, from the application, a request for one or more user identifiers that reference the one or more users, and sending, to a server, the contact information and the request for one or more user identifiers that reference the one or more users. In some embodiments, the method includes receiving, from the server, the one or more user identifiers that reference one or more users. Furthermore, the method may include receiving, from the server, a correlation between the one or more user identifiers and the one or more users, and, further, providing the one or more user identifiers and the correlation between the one or more user identifiers and the one or more users to the application.

In a third embodiment, a method for enabling an application to identify one or more users associated with a first user of the application is provided. The method includes receiving, from an application, a request for one or more user identifiers that reference one or more users in a contact list of the first user, wherein the contact list is not accessible to the application. Also, the method may include sending, to a server, the request for one or more user identifiers that reference one or more users in the contact list, receiving, from the server, the one or more user identifiers that reference one or more users, and, finally, providing the one or more user identifiers to the application.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings. These drawings do not limit any changes in form and detail that may be made to the described embodiments. Any such changes do not depart from the spirit and scope of the described embodiments.

In the figures, elements referred to with the same or similar reference numerals include the same or similar structure, use, or procedure, as described in the first instance of occurrence of the reference numeral.

DETAILED DESCRIPTION

Figure 1:
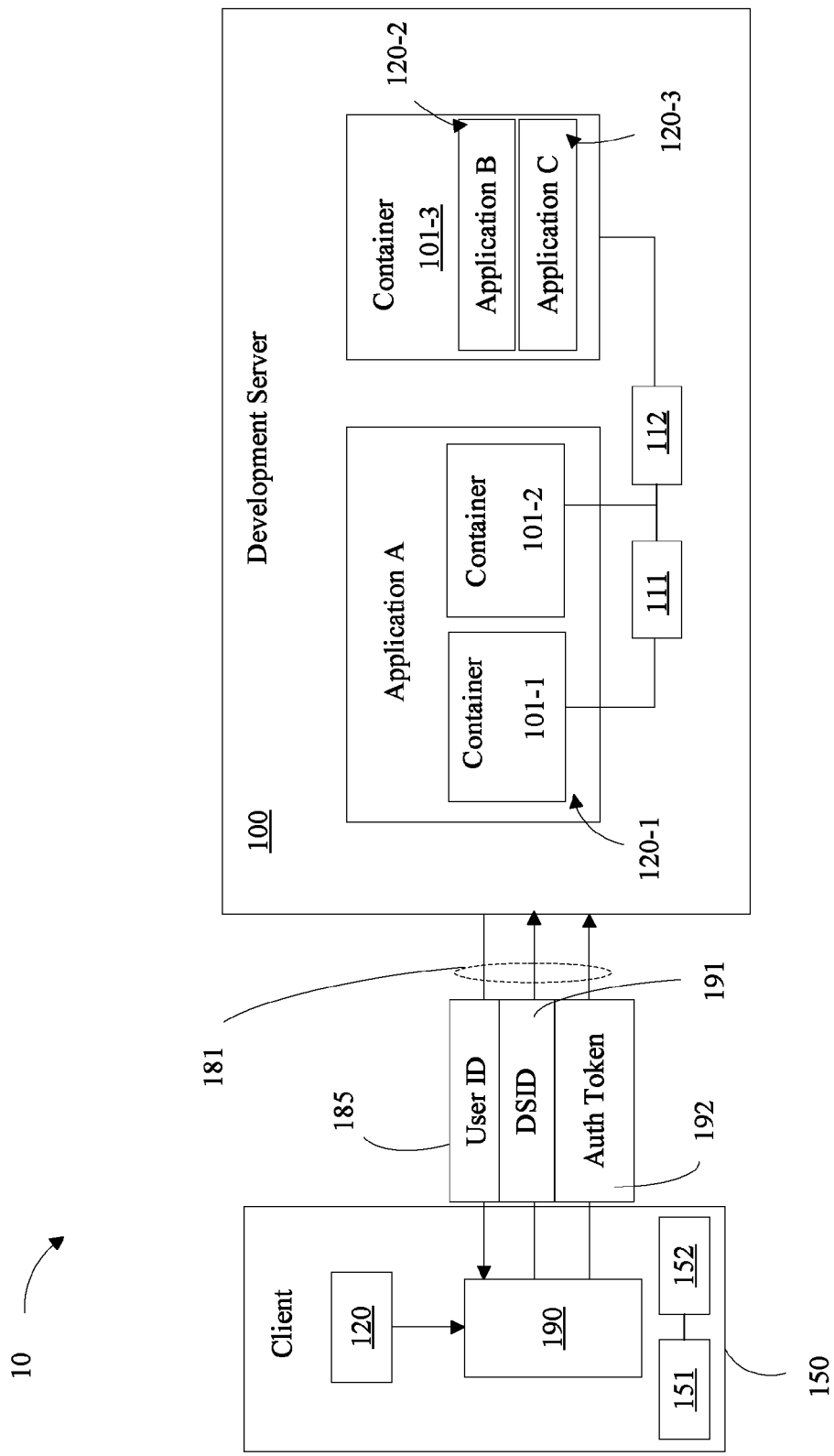
FIG. 1 illustrates a block diagram of a development server and a client device in a single sign-on configuration, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Use of network-based software applications has rapidly increased due to the availability of a large variety of portable or handheld electronic devices capable of coupling to a network. A client device, such as a smart phone, a tablet computer, or a laptop computer may run the software application by using remote resources accessible through a network server. The network server may be a development server providing storage and data processing capabilities to the software application (hereinafter referred to as 'application'). To run the application, the client device presents a unique authentication token to sign-on with the development server. With the authentication token, the development server may determine the attributes and privileges of the user handling the client device as regards to the software application. Thus, in embodiments disclosed herein, the user personal information is kept private from a third party.

In embodiments consistent with the present disclosure, the application logs-in the user without asking the user for private information or any other registration protocol. The authentication process is transparent to the user handling the client device, thus creating a pleasant experience. Any authenticated information or private information from the user is hidden from the application itself. The application sees a stable user ID consistent with data lists stored in the development server. Thus, according to embodiments disclosed herein, a single sign-on configuration protecting the user privacy is able to create stable user IDs for use across multiple applications. No private information from the user is shared with the application or the application developers. This is all the more relevant for users executing multiple applications, some of which may link the client device to a third party network server. The user handling the client device may desire to keep personal information private, and not share it with the third party network servers.

FIG. 1 illustrates a block diagram of a development server 100 and a client device 150 in a single sign-on configuration 10, according to some embodiments. In system 10, a client device 150 interacts with a development server 100 through a network link 181. Each of the client device 150, the development server 100, and the user electronic device 150 may include a memory circuit and a processor circuit. The memory circuits store commands and data that, when executed, cause the processor circuits to perform operations in accordance with embodiments disclosed herein. For example, client device 150 includes processor circuit 151 and memory circuit 152; and development server 100 includes processor circuit 111 and memory circuit 112.

Development server 100 includes a plurality of containers 101-1, 101-2, and 101-3 (collectively referred to hereinafter as containers 101). Containers 101 include data structures associated with Applications 120-1 (Application A), 120-2 (Application B), and 120-3 (Application C), generically referred to hereinafter as application 120. Containers 101 include data structures that are manipulated by processor circuit 111 upon request by client device 150. The specific correlation between containers 101 and Applications 120-1, 120-2, and 120-3 may not be one-to-one. For example, FIG. 1 illustrates Application A associated with containers 101-1 and 101-2, Application B associated with container 101-3, and Application C also associated with container 101-3. Containers 101 may be shared by multiple applications and multiple client devices. One of skill in the art will recognize that the specific number of containers 101 and applications in development server 100 is not limiting of embodiments consistent with the present disclosure. In other words, any number of applications and containers 101 may be included in development server 100. Furthermore, the number of applications 120 may be different from the number of containers 101.

Client device 150 includes an application 120 and a daemon 190. Application 120 may be any type of network-based executable software code, including any one of applications 120-1, 120-2, and 120-3. Daemon 190 may include an independent operating system process generated by applications executing on the client device. In some embodiments, configuration 10 involves implementing the daemon 190 on each of the client computing devices to interact with development server 100.

Accordingly, in some embodiments, development server 100 receives a request from client device 150 to create or lookup a given user identifier (ID) 185. Development server 100 then determines whether a user handling client device 150 is already registered with development server 100. If the user is not registered, then development server 100 creates user ID 185 associated with a Destination Signaling ID (DSID) 191. Client device 150 including DSID 191 may be associated with an authentication token 192. Authorization token 192 may be an encrypted code such as a password so that server 100 securely identifies client device 150. In some embodiments, authentication token 192 may also be associated to application 120. In that regard, when the user handling client device 150 taps on application 120, application 120 may prompt the user to enter authentication token 192. Development server 100 then returns user ID 185 associated with DSID 191 and authorization token 192 scoped to a container in the development server. DSID 191 may be an identifier for a client device, and authentication token 192 may be a password or some other encrypted code associated with DSID 191 and the application name. For example, a given application may have a password for access by a user handling the client device.

Figure 2:
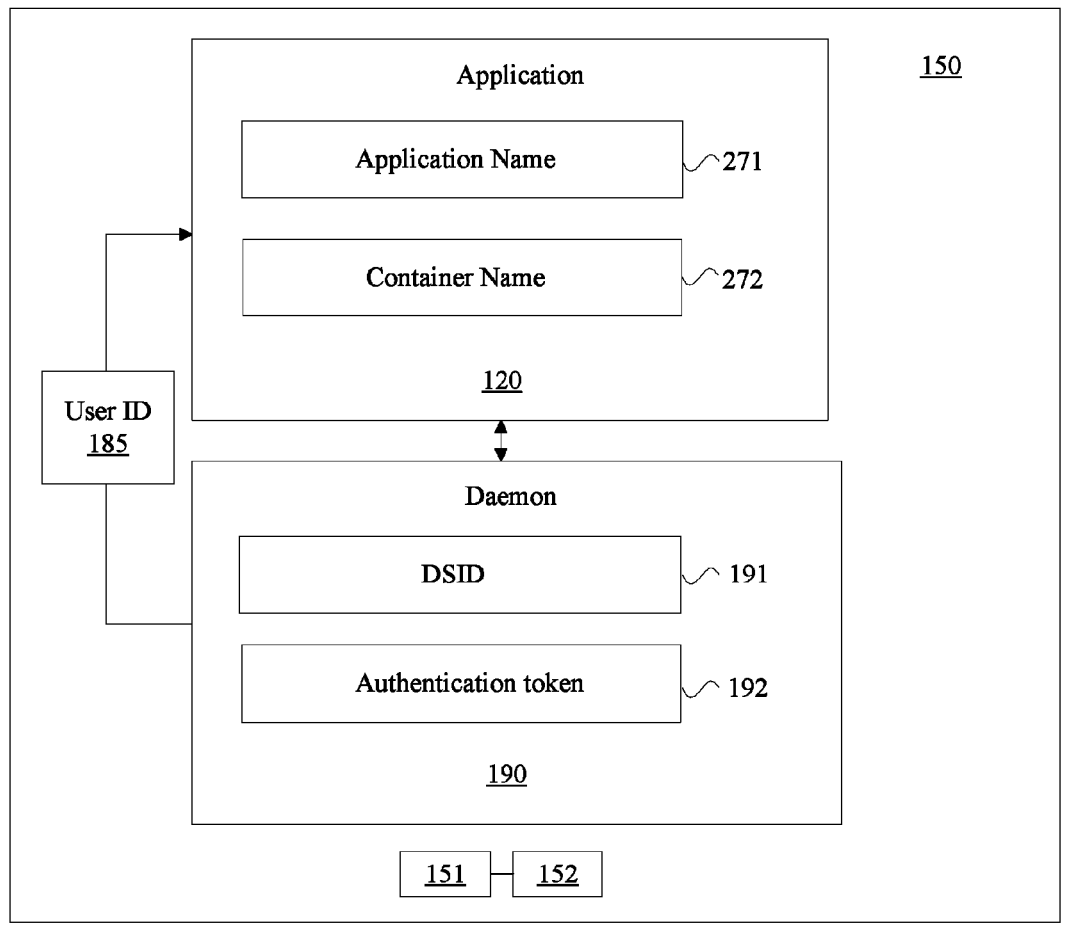
FIG. 2 illustrates a block diagram of a client device adapted for a single sign-on configuration, according to some embodiments.

FIG. 2 illustrates a block diagram of a client device 150 adapted for single sign-on configuration 10, according to some embodiments. Client device 150 includes application 120, daemon 190, processor circuit 151, and memory circuit 152. In some embodiments, application 120 further includes an application name 271 and a container name 272 that client device 150 provides daemon 190 to use in single sign-on configuration 10. Daemon 190 includes DSID 191 and authentication token 191, as discussed above. In some embodiments, authentication token 192 is provided to daemon 190 by the user, through a password or some other code, signature, or biometric measure.

According to some embodiments, daemon 190 provides DSID 191, authorization token 192, and application name 271 to development server 100. Daemon 190 may receive user ID 185 from development server 100 to execute application 120 in client device 150. Daemon 190 may transmit requests from development server 100 to client device 150 during execution of application 120. Such requests may be related to security procedures and maintenance operations by development server 100.

Client device 150 may be a portable electronic device such as a laptop or a tablet computer, a handheld electronic device such as a smart phone or any other cellular phone. In some embodiments, client device 150 may be a web site located in a network server operated by the client. Further, in some embodiments client device 150 may be a website located in a network server operated by a third party vendor, and a user of application 120 logs in to the web site.

Figure 3:
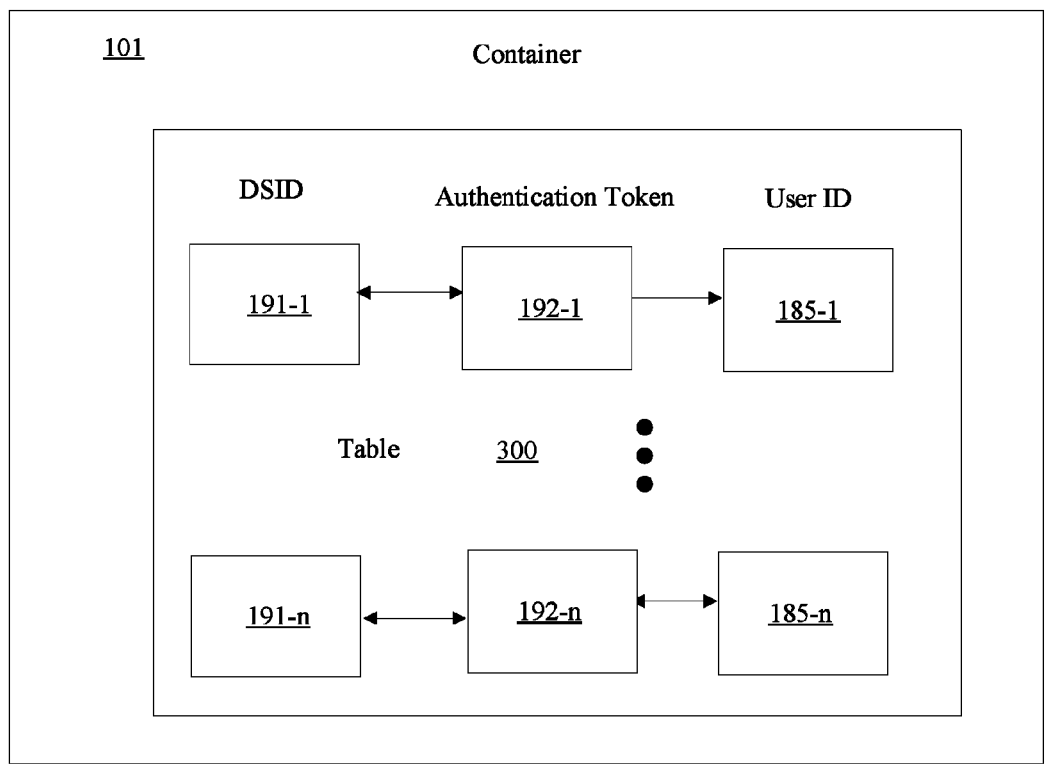
FIG. 3 illustrates a block diagram of a container in a development server adapted for a single sign-on configuration, according to some embodiments.

FIG. 3 illustrates a block diagram of a container 101 in development server 100 adapted for single sign-on configuration 10, according to some embodiments. Container 101 may include a table 300 having lines associating each of a plurality of DSIDs 191-1 through 191-n and each of a plurality of authentication tokens 192-1 through 192-n, with a plurality of user IDs 185-1 through 185-n. The value 'n' can be any number of lines in table 300, as one of ordinary skill will recognize.

In some embodiments of single sign-on configuration 10, development server 100 receives a request including application name 271 from client device 150. Then, development server 100 identifies any one of containers 101 (cf. FIG. 1) associated with application name 271. Development server 100 then determines whether there is an association (mapping) between DSID 191 and a user ID 185 in the identified container. If no association exists between DSID 191 and a user ID 185, then development server 100 creates user ID 185. Development server then adds a line to table 300 in the container. The line associates the newly created user ID 185 and DSID 191 of client device 150 requesting access to application 120. Accordingly, development server 100 returns newly created user ID 185 and authentication token 192 to client device 150. If there is an association between DSID 191 and user ID 185 in table 300, then development server 100 returns existing user ID 185 and authentication token 192 to client device 150. Thus, embodiments consistent with the present disclosure enable network-based software applications to be executed from client device 150 using a single sign-on procedure while protecting user privacy. For example, client device 150 may sign-on to development server 100 only once and be ready to execute a plurality of applications 120. Since table 300, including user IDs 185 associated with DSIDs 191 and authentication tokens 192, is stored in a container in the development server, a smooth and secure operation is obtained.

Figure 4:
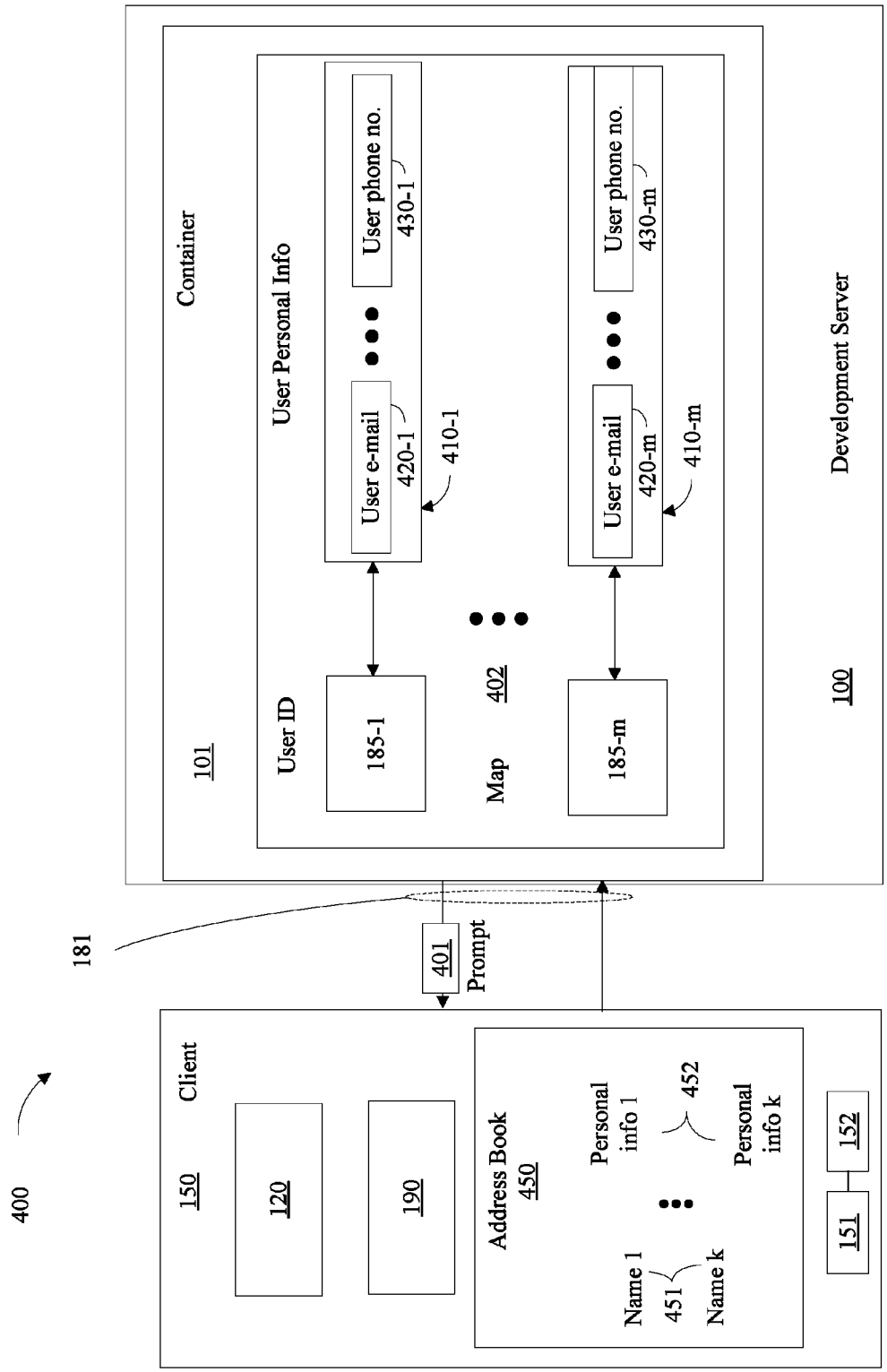
FIG. 4 illustrates a block diagram of a client and a container in an address book discovery configuration, according to some embodiments.

FIG. 4 illustrates a block diagram of a client device 150 and a container 101 in an address book discovery configuration 400, according to some embodiments. Client device 150 includes application 120, daemon 190, processor circuit 151, and memory circuit 152, as described in detail above (cf. FIGS. 1-3). Client device 150 may also include an address book 450. In some embodiments address book 450 may be stored in memory circuit 152. Accordingly, address book 450 includes a plurality of names 451 (names 1 through k). Associated with each of the plurality of names 451, address book 450 includes a plurality of lists 452 (lists 1 through k). Lists 452 include personal information for each name 451. In some embodiments, names 451 correspond to users subscribed to application 120. Further according to some embodiments, names 451 may correspond to users subscribed to an application contained in development server 100. Personal information 452 may include a user e-mail, a user phone number, address, mailing address, and other personal information associated with the name. Address book discovery configuration 400 may include a map 402 in container 101. Map 402 includes a list of user IDs 185-1 through 185-m. Each of user IDs 185-1 through 185-m is associated with a user personal information 410-through 410-m. User personal information 410 includes a user e-mail 420, a user phone no. 430, and any other personal information associated with user ID 185.

In some embodiments of address book discovery configuration 400, developer server 100 provides a prompt 401 to client device 150 to allow discovery of address book 450. Upon acceptance by the user handling client device 150, developer server 100 may perform a discovery of address book 450. The discovery may include searching for matches between entries in address book 450 with any of the entries in map 402 or in table 300 in container 101. For example, a match between a name 451 and a user ID 185 in table 300 (cf. FIG. 3) may be found during discovery. Accordingly, server 100 searches for matches in address book 450 with maps 400 and tables 300 in a plurality of containers 101. For example, some embodiments of an address book discovery configuration include search for matches of address book 450 in containers 101 not necessarily associated with application 120.

Figure 5:
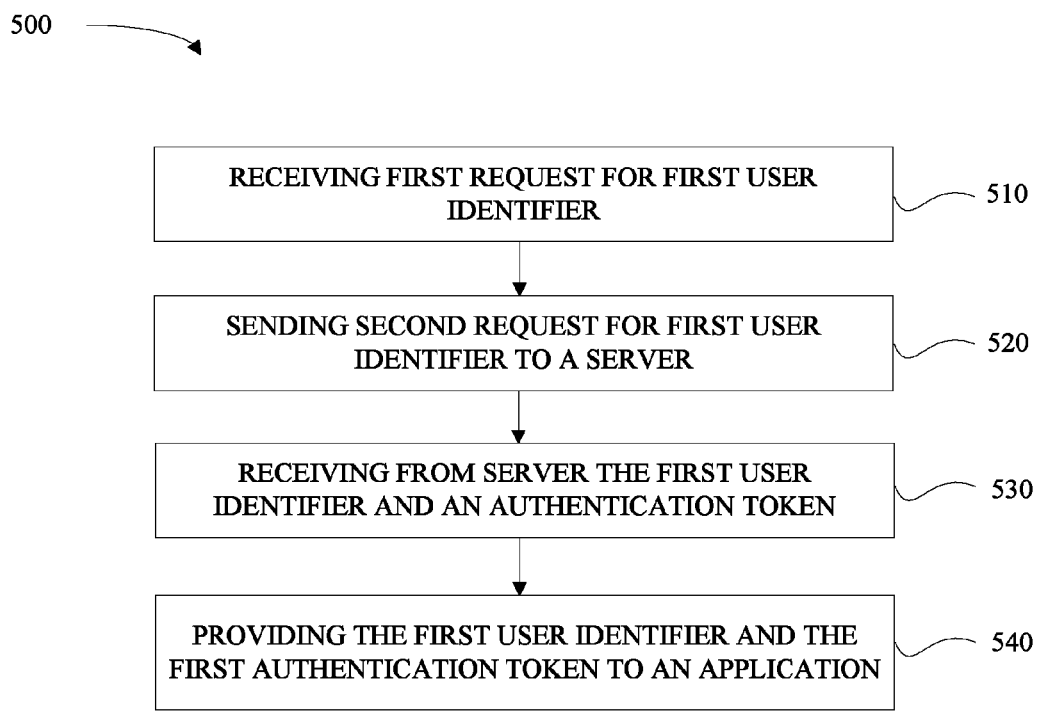
FIG. 5 illustrates a flow chart including steps in a method for a single sign-on configuration, according to some embodiments.

FIG. 5 illustrates a flow chart including steps in a method 500 for single sign-on configuration, according to some embodiments. A single sign-on configuration as illustrated in FIG. 5 may include a development server coupled to a client device through a network link (e.g., single sign-on configuration 10, development server 100, and client device 150, cf. FIG. 1 above). The client device may be executing a network-based software application (e.g., application 120, cf. FIG. 1). Steps in method 500 may be performed partially or completely by a processor circuit in the development server, where the processor circuit executes commands stored in a memory circuit (e.g., processor circuit 111 and memory circuit 112, cf. FIG. 1). In some embodiments, steps in method 500 may be performed partially or completely by a processor circuit in the client device, the processor circuit executing commands stored in a memory circuit (e.g., processor circuit 151, and memory circuit 152, cf. FIG. 1).

Step 510 includes receiving a first request for a first user identifier (e.g., user ID 185). The request may be provided by a server upon a user attempt to execute the network-based software application. Step 520 includes sending a second request for the first user identifier to a server (e.g., the developer server). For example, in some embodiments the request may be generated by a second network-based software application executed by the user handling the client device. In some embodiments step 520 may include providing the server a DSID an authentication token (e.g., DSID 191 and authentication token 192, cf. FIG. 1). Step 530 includes receiving from the server the first user identifier and the authentication token (e.g., user ID 185, and authentication token 192, cf. FIG. 1). According to some embodiments, steps 520 and 530 may be partially or totally performed by a daemon in the client device (e.g., daemon 190, cf. FIG. 1). Step 540 includes providing the first user identifier and the first authentication token to the application. Accordingly, in some embodiments step 540 is performed by the daemon in the client device.

Figure 6:
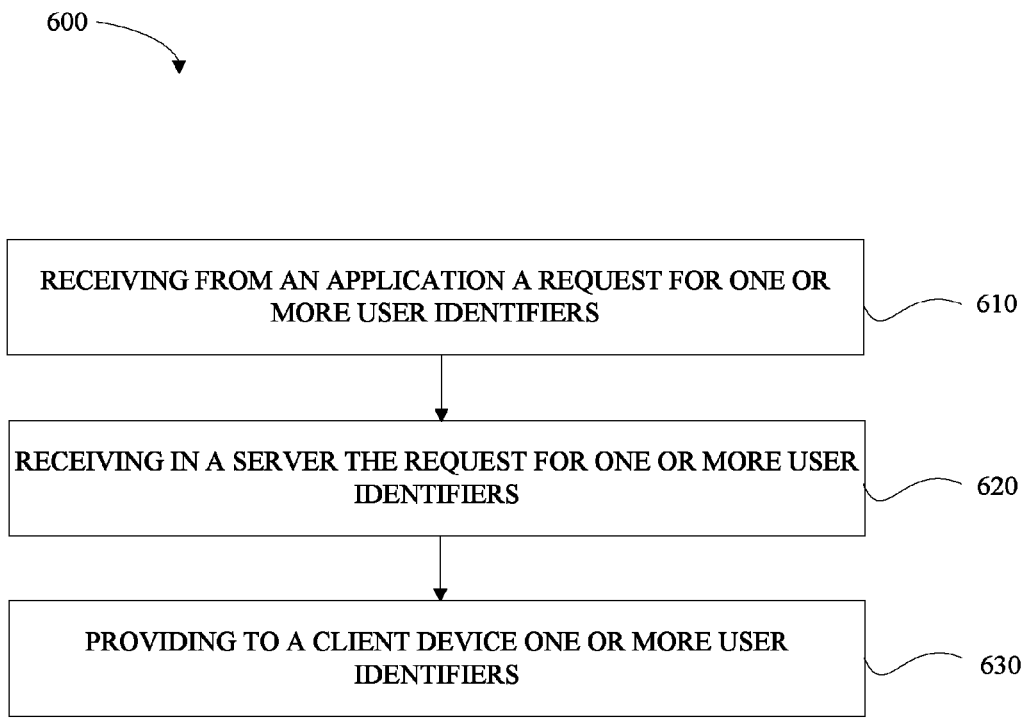
FIG. 6 illustrates a flow chart including steps in a method for a single sign-on configuration including multiple user identifiers, according to some embodiments.

FIG. 6 illustrates a flow chart including steps in a method 600 for single sign-on configuration including multiple user identifiers, according to some embodiments. A single sign-on configuration as illustrated in FIG. 6 may include a development server coupled to a client device through a network link (e.g., single sign-on configuration 10, development server 100, and client device 150, cf. FIG. 1 above). The client device may be executing a network-based software application (e.g., application 120, cf. FIG. 1). Steps in method 600 may be performed partially or completely by a processor circuit in the development server, where the processor circuit executes commands stored in a memory circuit (e.g., processor circuit 111 and memory circuit 112, cf. FIG. 1). In some embodiments, steps in method 600 may be performed partially or completely by a processor circuit in the client device, the processor circuit executing commands stored in a memory circuit (e.g., processor circuit 151, and memory circuit 152, cf. FIG. 1).

Step 610 may include receiving from the application a request for one or more user IDs (e.g., user ID 185, cf. FIG. 1). Step 620 may include sending to a server (e.g., the development server) the request for one or more user IDs from step 610. Step 630 may include receiving from the server one or more user IDs. Accordingly, in some embodiments steps 610 through 630 are performed partially or totally by the development server coupled to a daemon process in the client device daemon 190, cf. FIG. 1).

Figure 7:
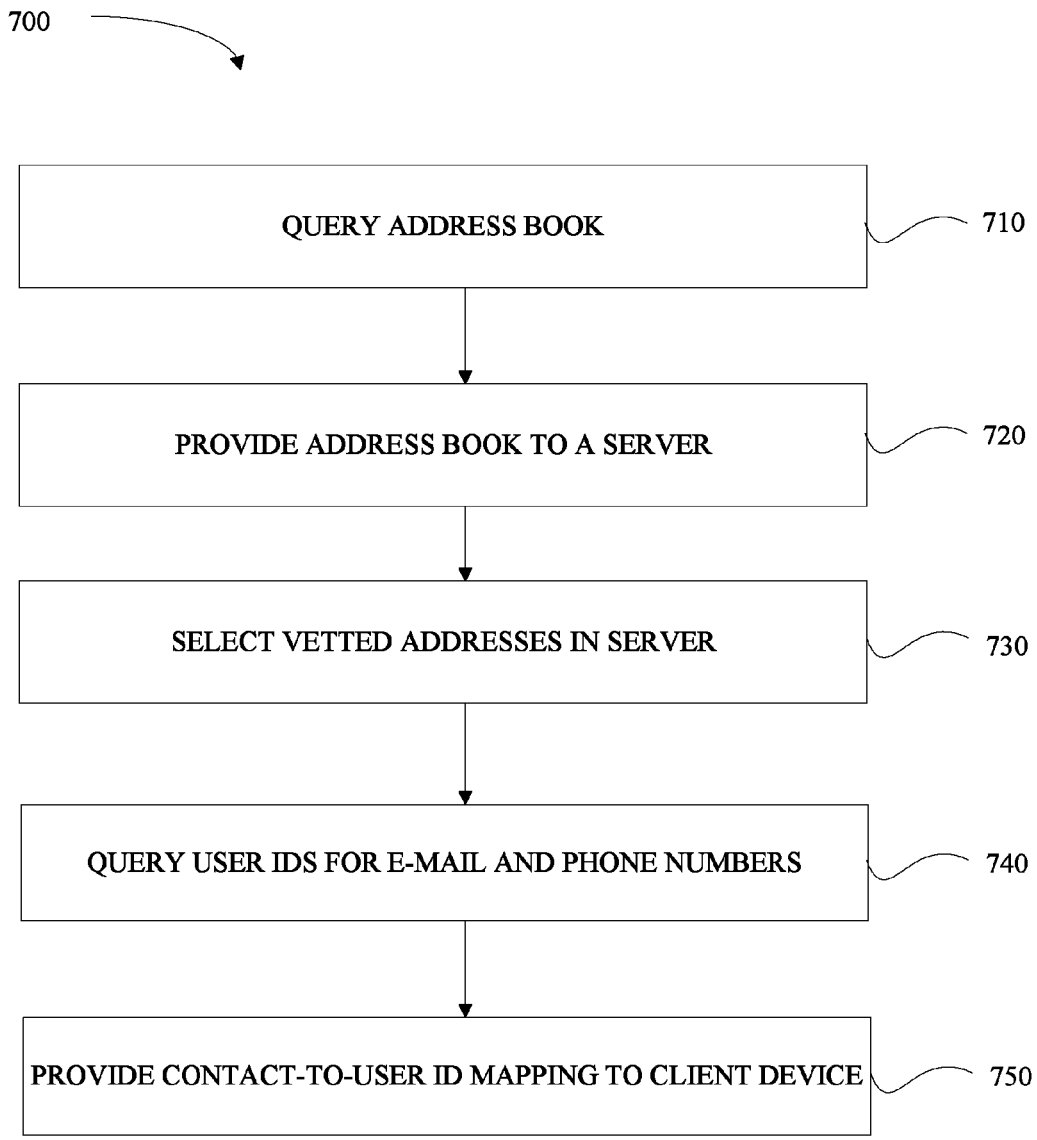
FIG. 7 illustrates a flow chart including steps in a method for discovering address books in network-based software applications, according to some embodiments.

FIG. 7 illustrates a flow chart including steps in a method 700 for discovering address books in network-based software applications, according to some embodiments. Method 700 may include a development server coupled to a client device through a network link (e.g., development server 100, and client device 150, cf. FIG. 1 above). Steps in method 700 may be performed partially or completely by a processor circuit in the development server, where the processor circuit executes commands stored in a memory circuit (e.g., processor circuit 111 and memory circuit 112, cf. FIG. 1). In some embodiments, steps in method 700 may be performed partially or completely by a processor circuit in the client device, the processor circuit executing commands stored in a memory circuit (e.g., processor circuit 151, and memory circuit 152, cf. FIG. 1).

Step 710 includes querying an address book in the client device. In some embodiments, step 710 may include providing a prompt requesting an address book query from a user handling the client device, by the server (e.g., prompt 401, cf. FIG. 4). Step 720 includes providing the address book to a server. Step 730 includes selecting vetted addresses from the server. Accordingly, step 730 may include comparing addresses in the address book with addresses in a container stored in the server (e.g., one of containers 101, cf. FIG. 1). A vetted address may be an address of a registered user included in the container. Step 740 includes querying user IDs for e-mail and phone numbers in the address book. Step 750 includes providing a contact-to-user ID mapping to the client device. Accordingly, step 750 may include creating a map in the container, or adding a line to an already existing map in the container (e.g., map 402, cf. FIG. 4).

Figure 8:
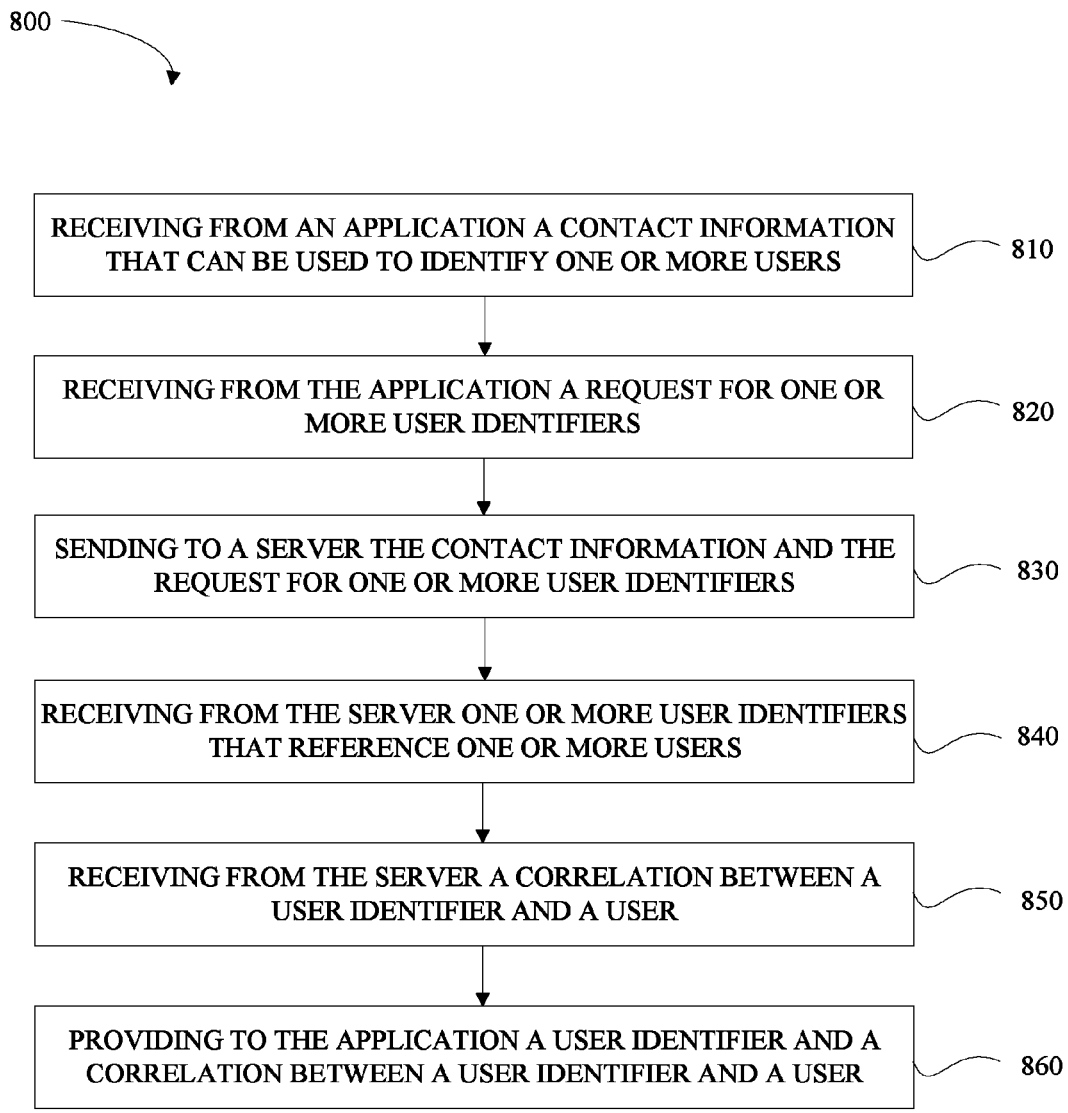
FIG. 8 illustrates a flow chart including steps in a method for discovering address books in network-based software applications, including receiving information selected from an address book, according to some embodiments.

FIG. 8 illustrates a flow chart including steps in a method 800 for discovering address books in network-based software applications, including receiving information selected from an address book, according to some embodiments. Method 800 may include a development server coupled to a client device through a network link (e.g., development server 100, and client device 150, cf. FIG. 1 above). The address book in method 800 may be stored in the client device (e.g., address book 450, cf. FIG. 4). The client device may be executing a network-based software application (e.g., application 120, cf. FIG. 1). Steps in method 800 may be performed partially or completely by a processor circuit in the development server, where the processor circuit executes commands stored in a memory circuit (e.g., processor circuit 111 and memory circuit 112, cf. FIG. 1). In some embodiments, steps in method 800 may be performed partially or completely by a processor circuit in the client device, the processor circuit executing commands stored in a memory circuit (e.g., processor circuit 151, and memory circuit 152, cf. FIG. 1). Furthermore, steps in method 800 may be performed by a daemon process coupling the client device with the server through a network link (e.g., daemon 190 and link 181, cf. FIG. 1).

Step 810 includes receiving from the application contact information that can be used to identify one or more users. Accordingly, step 810 may include personal information retrieved from the address book in the client device (e.g., personal information 452, FIG. 4). Step 820 includes receiving from the application a request for one or more user identifiers. The one or more user identifiers may be associated with one or more network-based software applications being executed by one or more client devices. Step 830 includes sending to a server (e.g., development server 100) the contact information and the request for the one or more user identifiers. Step 840 includes receiving from the server one or more user identifiers that reference on or more users. For example, in some embodiments a single user handling a client device may be associated with one or more user identifiers for one or more applications. Step 850 includes receiving from the server a correlation between a user identifier and a user. Accordingly, step 850 may include receiving a map from the server (e.g., map 402, cf. FIG. 4). Step 860 includes providing to the application a user identifier and a correlation between a user identifier and a user. Accordingly, step 860 may be performed by the daemon interacting with the network-based software application in the client device.

Figure 9:
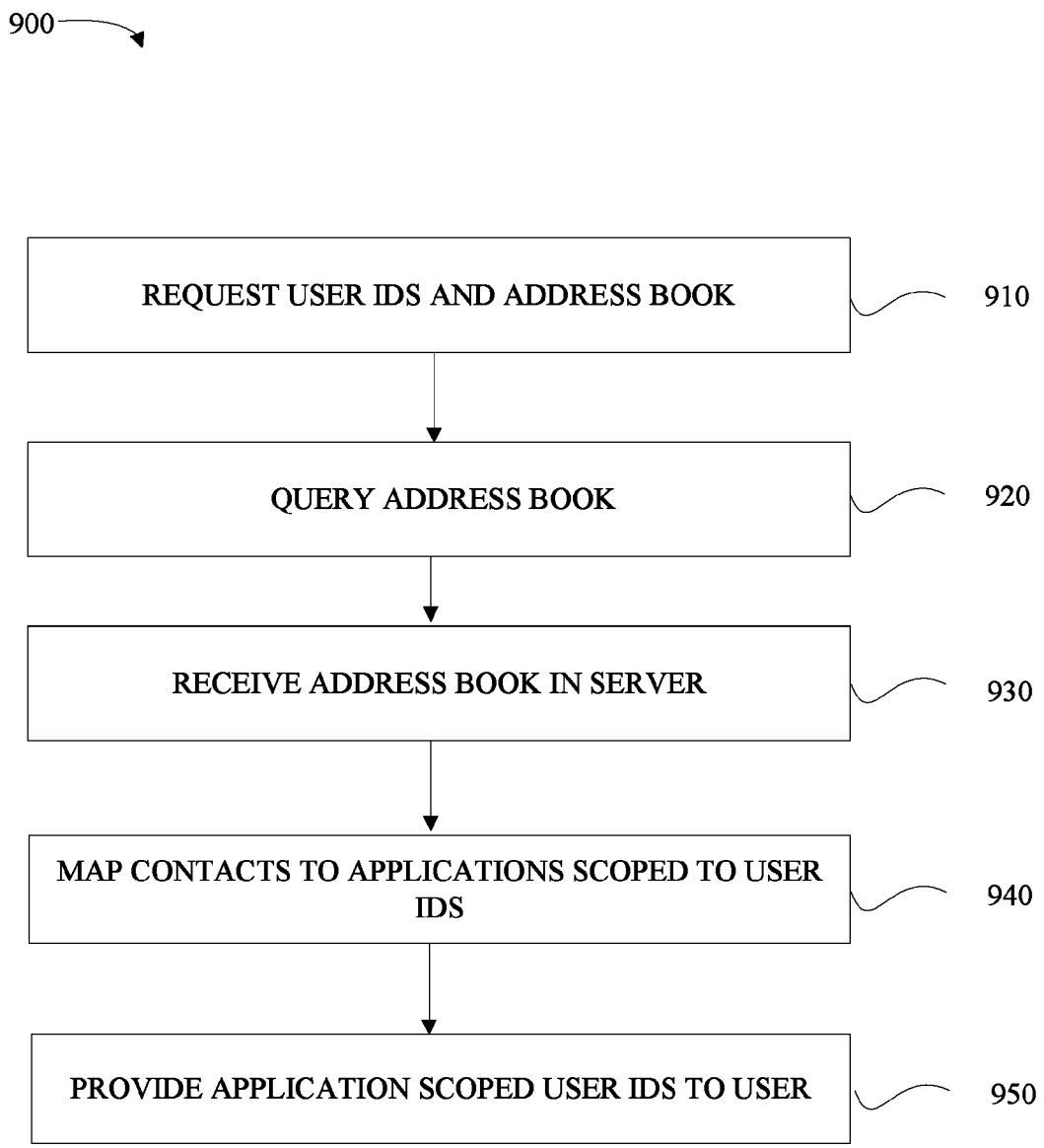
FIG. 9 illustrates a flow chart including steps in a method for discovering address books in network-based software applications, according to some embodiments.

FIG. 9 illustrates a flow chart including steps in a method 900 for discovering address books in network-based software applications, according to some embodiments. Method 900 may include a development server coupled to a client device through a network link (e.g., development server 100, and client device 150, cf. FIG. 1 above). The address book in method 900 may be stored in the client device (e.g., address book 450, cf. FIG. 4). Steps in method 900 may be performed partially or completely by a processor circuit in the development server, where the processor circuit executes commands stored in a memory circuit (e.g., processor circuit 111 and memory circuit 112, cf. FIG. 1). In some embodiments, steps in method 900 may be performed partially or completely by a processor circuit in the client device, the processor circuit executing commands stored in a memory circuit (e.g., processor circuit 151, and memory circuit 152, cf. FIG. 1). Steps in method 900 may be performed by the server interacting with a daemon process running in the client device (daemon 190, cf. FIG. 1).

Step 910 includes requesting user IDs and an address book to the client device. Step 920 includes querying an address book in the client device. Step 920 may include searching in the address book for names that may be stored in a container included in the server (e.g., names 451 and container 101, cf. FIG. 4). Step 930 includes receiving the address book in the server (e.g., the development server). Accordingly, step 930 may include receiving the entire address book from the client device. In some embodiments step 930 includes receiving in the server only the portions of the address book that have a match between a name in the address book and a name stored in the container. Step 940 includes mapping contacts to network-based software applications scoped to the user IDs. Accordingly, step 940 may include adding lines in a map included in a container. The added lines may include user e-mail values and user phone number values retrieved from the address book (e.g., user e-mails 420 and user phone nos. 430, cf. FIG. 4). Step 950 includes providing the application scoped user IDs to a user registered in the server. Accordingly, the user registered in the server may be a different user than the user handling the client device from which the address book has been queried.

Figure 10:
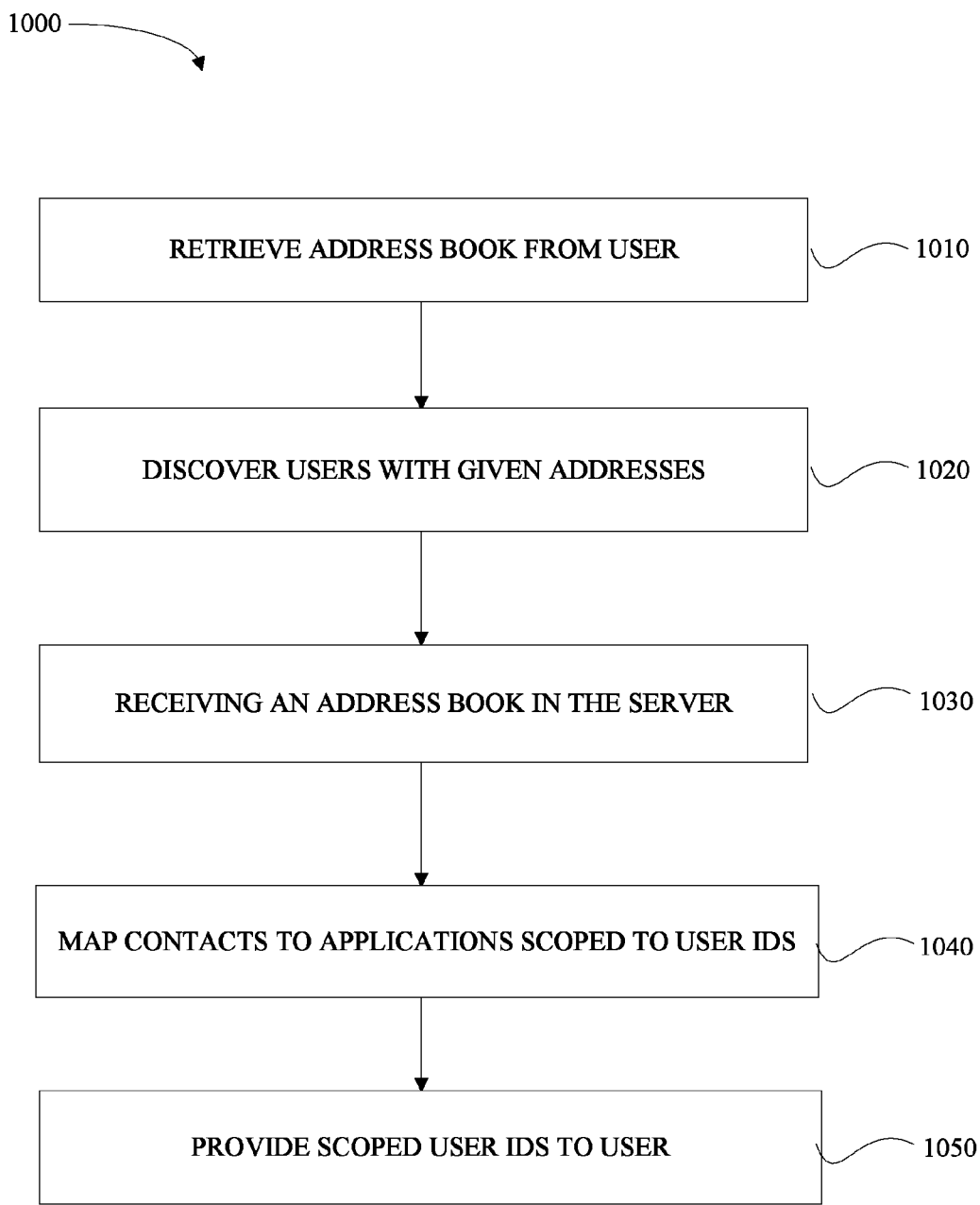
FIG. 10 illustrates a flow chart including steps in a method for discovering address books in network-based software applications as above, including discovering users with given addresses, according to some embodiments.

FIG. 10 illustrates a flow chart including steps in a method 1000 for discovering address books in network-based software applications, including discovering users with given addresses, according to some embodiments. Method 1000 may include a development server coupled to a client device through a network link (e.g., development server 100, and client device 150, cf. FIG. 1 above). Address books in method 1000 may be stored in the client device (e.g., address book 450, cf. FIG. 4). Steps in method 1000 may be performed partially or completely by a processor circuit in the development server, where the processor circuit executes commands stored in a memory circuit (e.g., processor circuit 111 and memory circuit 112, cf. FIG. 1). In some embodiments, steps in method 1000 may be performed partially or completely by a processor circuit in the client device, the processor circuit executing commands stored in a memory circuit (e.g., processor circuit 151, and memory circuit 152, cf. FIG. 1). Steps in method 900 may be performed by the server interacting with a daemon process running in the client device (daemon 190, cf. FIG. 1).

Step 1010 includes retrieving an address book from a user registered to a server. Step 1020 includes discovering users with given addresses in the address book. For example, step 1020 may include finding a match for a known address stored in a container included in the server with an address in the address book included in the client device. Step 1030 includes receiving an address book in the server. Accordingly, step 1030 may include receiving the entire address book from the client device. In some embodiments step 1030 includes receiving in the server only the portions of the address book that have a match between an address in the address book and an address stored in a container (e.g., container 101, cf. FIG. 4). Step 1040 includes mapping contacts to network-based software applications scoped to the user IDs. Accordingly, step 1040 may include associating a user ID and user personal information in a map (e.g., map 402) with a plurality of applications included in the container. Step 1050 includes providing the scoped user IDs to a user registered in the server. Accordingly, the user registered in the server may be a different user than the user handling the client device from which the address book has been queried.

Figure 11:
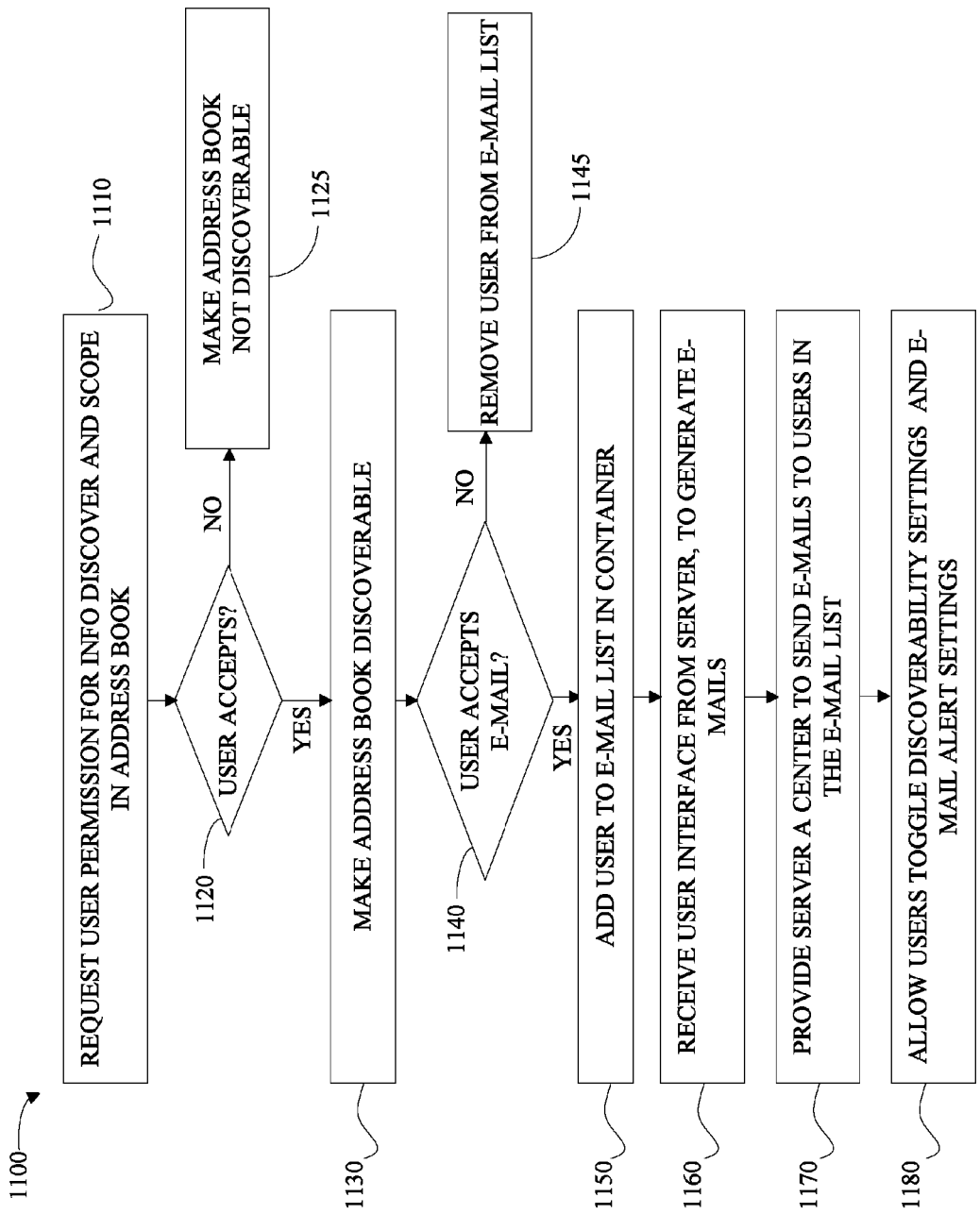
FIG. 11 illustrates a flow chart including steps in a method for creating e-mail user lists, according to some embodiments.

FIG. 11 illustrates a flow chart including steps in a method 1100 for creating e-mail user lists, according to some embodiments. Method 1100 may include a development server coupled to a client device through a network link (e.g., development server 100, client device 150, and network link 181, cf. FIG. 1 above). Steps in method 1100 may be performed partially or completely by a processor circuit in the development server, where the processor circuit executes commands stored in a memory circuit (e.g., processor circuit 111 and memory circuit 112, cf. FIG. 1). In some embodiments, steps in method 1100 may be performed partially or completely by a processor circuit in the client device, the processor circuit executing commands stored in a memory circuit (e.g., processor circuit 151, and memory circuit 152, cf. FIG. 1).

Step 1110 includes requesting user permission for information discover and discovery scope in an address book. The address book in method 1100 may be stored in the client device (e.g., address book 450, cf. FIG. 4). If the user does not accept in step 1120, then step 1125 includes making the address book not discoverable. If the user accepts in step 1120, step 1130 includes making the address book discoverable. For example, step 1130 may include providing a daemon in the client device with a configuration that allows the server to perform a method such as methods 700, 800, and 900, above. Step 1140 determines if the user accepts e-mails from the server. If the user rejects e-mails from the server, step 1145 includes removing the user from an e-mail list. If the user accepts e-mails from the server, step 1150 includes adding the user to the e-mail list. Step 1160 includes receiving a user interface from the server (e.g., developer server 100) to generate e-mails. Step 1170 includes providing the server a center to send e-mails to users in the e-mail list. Step 1180 includes allowing users to toggle discoverability settings and e-mail alert settings. In some embodiments, the toggles may be grouped according to a plurality of containers in the server (e.g., containers 101, cf. FIG. 1).

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for identifying common users of a network-based software application, the method comprising, at a daemon executing on a client device:
   receiving, from the network-based software application, a request to identify one or more contacts within an address book that are registered with the network-based software application;
   providing, to a server device, a first set of information associated with at least one contact from the one or more contacts within the address book;
   receiving, from the server device, a unique identifier that corresponds to the at least one contact, wherein the unique identifier indicates that the at least one contact is registered with the network-based software application based at least in part on matching the first set of information with a second set of information stored at the server device; and
   providing the unique identifier to the network-based software application, wherein the network-based software application utilizes the unique identifier to provide functionality associated with the at least one contact without exposing both the first and second sets to the network-based software application.

2. The method of claim 1, further comprising, prior to providing the first set of information to the server device:
   issuing a prompt to access to the address book; and
   receiving an authorization to access the address book.

3. The method of claim 1, wherein the unique identifier is scoped to the network-based software application.

4. The method of claim 1, wherein the at least one contact is registered with the network-based software application when an instance of the network-based software application is installed on a different client device associated with the at least one contact.

5. The method of claim 4, wherein the unique identifier corresponds to the instance of the network-based software application installed on the different client device.

6. The method of claim 1, wherein the first set of information about the at least one contact includes an email address and/or a phone number associated with the at least one contact.

7. The method of claim 6, wherein the unique identifier corresponds to the email address and/or the phone number associated with the at least one contact, but the unique identifier does not reveal the email address and/or the phone number associated with the at least one contact.

8. A non-transitory computer readable storage medium configured to store instructions that, when executed by a processor included in a computing device, cause the computing device to carry out steps that include:
   receiving, from a network-based software application, a request to identify one or more contacts within an address book that are registered with the network-based software application;
   providing, to a server device, a first set of information associated with at least one contact from the one or more contacts within the address book;
   receiving, from the server device, a unique identifier that corresponds to the at least one contact, wherein the unique identifier indicates that the at least one contact is registered with the network-based software application based at least in part on matching the first set of information with a second set of information stored at the server device; and
   providing the unique identifier to the network-based software application, wherein the network-based software application utilizes the unique identifier to provide functionality associated with the at least one contact without exposing both the first and second sets to the network-based software application.

9. The non-transitory computer readable storage medium of claim 8, wherein the steps further include, prior to providing the first set of information to the server device:
   issuing a prompt to access to the address book; and
   receiving an authorization to access the address book.

10. The non-transitory computer readable storage medium of claim 8, wherein the unique identifier is scoped to the network-based software application.

11. The non-transitory computer readable storage medium of claim 8, wherein the at least one contact is registered with the network-based software application when an instance of the network-based software application is installed on a different client device associated with the at least one contact.

12. The non-transitory computer readable storage medium of claim 11, wherein the unique identifier corresponds to the instance of the network-based software application installed on the different client device.

13. The non-transitory computer readable storage medium of claim 8, wherein the first set of information about the at least one contact includes an email address and/or a phone number associated with the at least one contact.

14. The non-transitory computer readable storage medium of claim 13, wherein the unique identifier corresponds to the email address and/or the phone number associated with the at least one contact, but the unique identifier does not reveal the email address and/or the phone number associated with the at least one contact.

15. A computing device, comprising:
   a processor; and
   a memory configured to store instructions that, when executed by the processor, cause the computing device to carry out steps that include:
   receiving, from a network-based software application, a request to identify one or more contacts within an address book that are registered with the network-based software application;
   providing, to a server device, a first set of information associated with at least one contact from the one or more contacts within the address book;
   receiving, from the server device, a unique identifier that corresponds to the at least one contact, wherein the unique identifier indicates that the at least one contact is registered with the network-based software application based at least in part on matching the first set of information with a second set of information stored at the server device; and
   providing the unique identifier to the network-based software application, wherein the network-based software application utilizes the unique identifier to provide functionality associated with the at least one contact without exposing both the first and second sets to the network-based software application.

16. The computing device of claim 15, wherein the steps further include, prior to providing the first set of information to the server device:
   issuing a prompt to access to the address book; and
   receiving an authorization to access the address book.

17. The computing device of claim 15, wherein the unique identifier is scoped to the network-based software application.

18. The computing device of claim 15, wherein the at least one contact is registered with the network-based software application when an instance of the network-based software application is installed on a different client device associated with the at least one contact.

19. The computing device of claim 18, wherein the unique identifier corresponds to the instance of the network-based software application installed on the different client device.

20. The computing device of claim 15, wherein the first set of information about the at least one contact includes an email address and/or a phone number associated with the at least one contact.

* * * * *